US012408060B2

(12) United States Patent
Li

(10) Patent No.: US 12,408,060 B2
(45) Date of Patent: Sep. 2, 2025

(54) METHOD AND TERMINAL FOR REPORTING LOCATION MEASUREMENT DATA, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 411 days.

(21) Appl. No.: 18/009,328

(22) PCT Filed: Jul. 17, 2020

(86) PCT No.: PCT/CN2020/102786

§ 371 (c)(1),
(2) Date: Dec. 9, 2022

(87) PCT Pub. No.: WO2022/011704

PCT Pub. Date: Jan. 20, 2022

(65) Prior Publication Data

US 2023/0232266 A1 Jul. 20, 2023

(51) Int. Cl.
*H04W 24/10* (2009.01)
*H04W 64/00* (2009.01)
*H04W 84/12* (2009.01)

(52) U.S. Cl.
CPC .......... *H04W 24/10* (2013.01); *H04W 64/00* (2013.01); *H04W 84/12* (2013.01)

(58) Field of Classification Search
CPC ...... H04W 24/10; H04W 64/00; H04W 84/12
See application file for complete search history.

(56) References Cited

U.S. PATENT DOCUMENTS

| | | | |
|---|---|---|---|
| 9,173,062 | B2 | 10/2015 | Hu et al. |
| 9,179,304 | B2 | 11/2015 | Zelinka et al. |
| 10,382,589 | B2 | 8/2019 | Wang et al. |
| 10,397,749 | B1 | 8/2019 | Barua et al. |
| 2014/0080508 | A1 | 3/2014 | Hu et al. |
| 2016/0205219 | A1 | 7/2016 | Wang et al. |

FOREIGN PATENT DOCUMENTS

| | | | |
|---|---|---|---|
| CN | 102223601 | A | 10/2011 |
| CN | 105828430 | A | 8/2016 |
| CN | 110881211 | A | 3/2020 |
| EP | 2672767 | A1 | 12/2013 |
| WO | 2018220637 | A1 | 12/2018 |

OTHER PUBLICATIONS

International Search Report of PCT Application No. PCT/CN2020/102786 dated Feb. 20, 2021 with English translation, (4p).
Indian Office Action issued to Indian Application No. 202247072292 dated May 1, 2023, with partial English translation, (6p).

*Primary Examiner* — Natasha W Cosme
(74) *Attorney, Agent, or Firm* — Arch & Lake LLP

(57) ABSTRACT

A method for reporting location measurement data includes: acquiring location measurement data; determining a location-measurement-data report type, report content indicated by different location-measurement-data report types being different; and reporting the location measurement data based on the determined location-measurement-data report type.

18 Claims, 5 Drawing Sheets acquiring location measurement data — 201 determining a location-measurement-data report type, report content indicated by different location-measurement-data report types being different — 202 reporting the location measurement data based on the determined location-measurement-data report type — 203

METHOD AND TERMINAL FOR REPORTING LOCATION MEASUREMENT DATA, AND STORAGE MEDIUM

CROSS-REFERENCE TO RELATED APPLICATION

This application is a national phase of International Application No. PCT/CN2020/102786 filed on Jul. 17, 2020, the entire content of which is incorporated herein by reference for all purposes.

TECHNICAL FIELD

The disclosure relates to the field of wireless communication technologies, and particularly, to a method for reporting location measurement data, a terminal, and a storage medium.

BACKGROUND

In a mobile communication network, it may position a terminal through measuring by the terminal on mobile signals, to support a location-based application in the terminal.

In the related art, the terminal may acquire location measurement data through measuring wireless signals sent by a plurality of base stations or transmission reception points (TRPs), and report the location measurement data to a location management function (LMF) entity on a network side. After the LMF determines a location of the terminal based on the location measurement data, it returns the determined location to the terminal.

SUMMARY

According to a first aspect of the disclosure, a method for reporting location measurement data is provided and performed by a terminal. The method includes: acquiring location measurement data; determining a location-measurement-data report type, report content indicated by different location-measurement-data report types being different; and reporting the location measurement data based on the determined location-measurement-data report type.

According to a second aspect of the disclosure, a device for reporting location measurement data is provided and applicable to a terminal. The device includes: a processor; and a memory configured to store instructions executable by the processor; in which, the processor is configured to: acquire location measurement data; determine a location-measurement-data report type, report content indicated by different location-measurement-data report types being different; and report the location measurement data based on the determined location-measurement-data report type.

According to a third aspect of the disclosure, a computer readable storage medium is provided. The computer readable storage medium includes executable instructions. The executable instructions are called by a processor of a terminal to implement the method for reporting location measurement data as described in the first aspect or any possible solution of the first aspect.

It is to be understood that both the foregoing general description and the following detailed description are exemplary and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure.

It should be understood that "several" mentioned in the disclosure may refer to one or more, and "plurality" or "multiple" may refer to two or more. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship.

Figure 1:
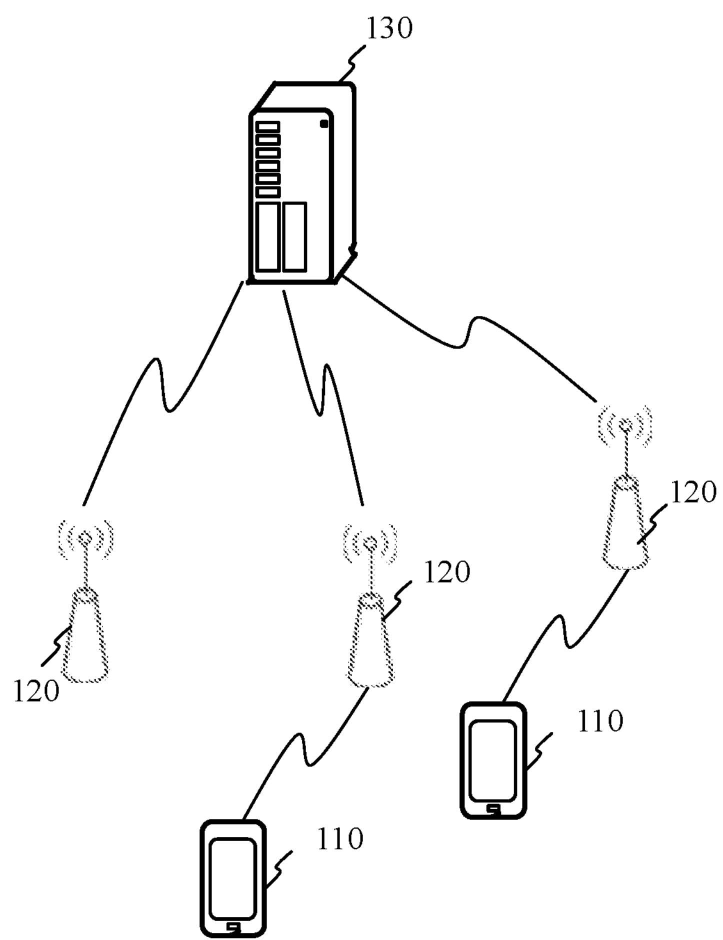
FIG. 1 is a diagram illustrating an implementation environment according to some embodiments.

FIG. 1 is a diagram illustrating an implementation environment of a method for reporting location measurement data according to some embodiments. As illustrated in FIG. 1, the implementation environment may include several terminals 110 and access point devices 120.

The access point device 120 may be a base station or a wireless local area network (WLAN) terminal.

The terminal 110 may be a wireless communication device that supports a plurality of wireless access technologies. For example, the terminal 110 may support a cellular mobile communication technology, such as, a 5th generation (5G) mobile networks technology. Or, the terminal 110 may support a next generation mobile communication technology of the 5G technology.

For example, the terminal 110 may be a user terminal device, for example, a mobile phone (or referred to as a "cellular" phone) and a computer having a mobile terminal, such as, a portable, compact, handheld, computer built-in, or vehicle-mounted mobile device. For example, a station (STA), a subscriber unit, a subscriber station, a mobile station, a mobile, a remote station, an access point, a remote terminal, an access terminal, a user terminal, a user agent, a user device, or a user equipment (UE).

For example, the terminal 110 may be a mobile terminal such as a smart phone, a tablet, or an e-book reader, or a smart wearable device such as smart glasses, a smart watch, or a smart band, or an Internet of Things (IoT) user device, or an Industrial Internet of Things (IIoT) user device.

Or, the terminal 110 also may be a vehicle-mounted communication device, for example, a vehicle computer with a wireless communication function or a wireless communication device externally connected to a vehicle computer.

The access point device 120 may be a network side device in the wireless communication system. The wireless communication system may be a 5G system, also referred to as a 5G new radio (NR) system. Or, the wireless communication system may be a next generation system of the 5G system. Or, the wireless communication system may be a local area network system, for example, a WLAN system.

When the access point device 120 is the base station, the base station may be a next generation node base station (gNB) adopting a centralized and distributed architecture in the 5G system. When the base station adopts the centralized and distributed architecture, it usually includes a central unit (CU) and at least two distributed units (DUs). The central unit is provided with a protocol stack of a packet data convergence protocol (PDCP) layer, a radio link control (RLC) layer, and a media access control (MAC) layer. The distributed unit is provided with a protocol stack of a physical (PHY) layer. Embodiments of the disclosure may not limit the implementation manner of the base station.

When the access point device 120 is the WLAN terminal, the WLAN terminal may be a wireless router.

A wireless connection may be established between the access point device 120 and the terminal 110 through a wireless air interface. The wireless air interface may be a wireless air interface based on the 5G standard, such as the wireless air interface is a new air interface; or the wireless air interface may be a wireless air interface based on the next generation mobile communication network technology standard following the 5G standard.

Optionally, the wireless communication system further may include a network management device 130.

Several access point devices 120 are connected to the network management device 130 respectively. When the access point device 120 is the base station, the network management device 130 may be a core network device in the wireless communication system. For example, the network management device 130 may be an LMF or a mobility management entity (MME) in an evolved packet core (EPC). Or, the network management device may be other core network devices, such as a serving gateway (SGW), a public data network gateway (PGW), a policy and charging rules function, a home subscriber server (HSS), or the like. The implementation form of the network management device 130 is not limited in embodiments of the disclosure.

In the 5G NR system, location measurement for the terminal is supported. In the NR Rel-16, it discusses location measurement for the terminal in a connected state and defines positioning-purpose reference signals. The positioning-purpose reference signals include a downlink positioning reference signal (PRS) and an uplink reference signal for positioning (that is a sounding reference signal (SRS) for positioning). The location measurement includes terminal measurement and base station measurement. Measured values include a signal strength measured value, a signal transmission duration value, an angle value of channel arrival or an angle value of channel departure, and the like.

For the terminal measurement, in an implementation, after the terminal measures the positioning-purpose reference signals, it needs to report a measurement result to the LMF. The LMF determines a location of the terminal based on the measurement result of terminal and locations of a plurality of base stations/TRPs that send the positioning-purpose reference signals to the terminal. If necessary, the LMF feeds back a calculation result to the terminal when calculating the location of the terminal.

However, for a single terminal, it may appear at the same location many times one day or pass through a plurality of same locations every day. For a plurality of terminals, a location where a terminal A is located at a first moment is a location where a terminal B is located at a second moment before the first moment, and the terminal B has reported the location measurement data to the LMF and acquired location feedback of the LMF at the same time. In combination with the two cases, when the terminal measures the positioning-purpose reference signals between the terminal and the plurality of base stations or TRPs and reports them each time, the reporting procedures are redundant, that is, one or more terminals report the same location measurement data at the same location and the LMF also feeds back the same location feedback. Therefore, a signaling overhead or a transmission resource overhead for reporting the location measurement data is relatively large, and since the terminal needs to wait for the location feedback of the LMF when reporting the location measurement data, a large location latency is brought.

In solutions as illustrated in subsequent embodiments of the disclosure, after the terminal acquire the location measurement data when the terminal performs the location measurement, solutions about how to report the location measurement data based on different report types may be provided, which may reduce reporting of unnecessary location measurement data, thereby saving signalings or transmission resources and shortening the location latency.

Figure 2:
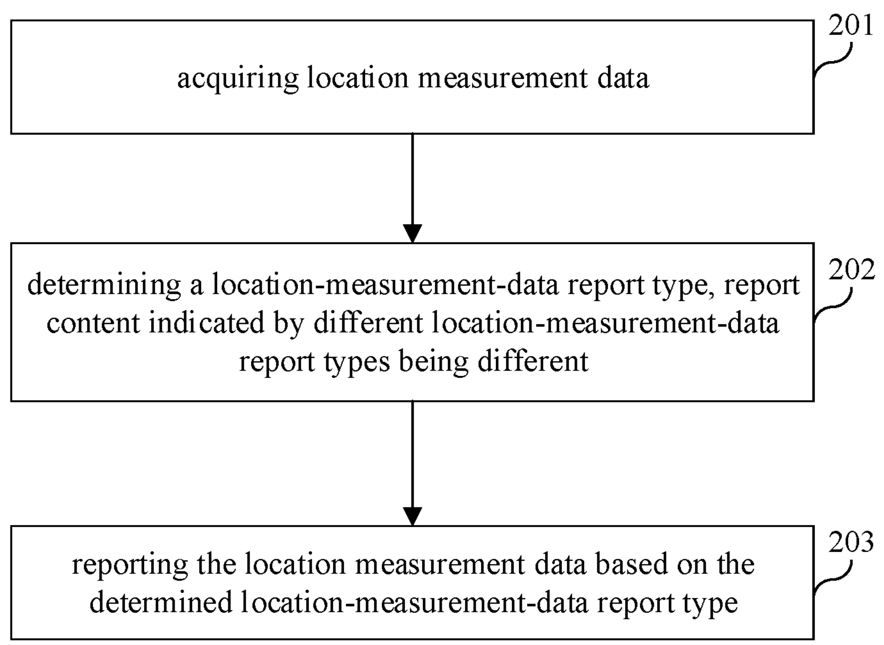
FIG. 2 is a flowchart illustrating a method for reporting location measurement data according to some embodiments.

FIG. 2 is a flowchart illustrating a method for reporting location measurement data according to some embodiments. The method for reporting location measurement data may be performed by a terminal, for example, the terminal 110 in the implementation environment as illustrated in FIG. 1. As illustrated in FIG. 2, the method may include the following steps.

At step 201, location measurement data is acquired.

At step 202, a location-measurement-data report type is determined, report content indicated by different location-measurement-data report types being different.

At step 203, the location measurement data is reported based on the determined location-measurement-data report type.

In a possible implementation, determining the location-measurement-data report type, includes: acquiring related location data corresponding to the location measurement data; acquiring a processing result by processing the related location data through a location model; and acquiring the location-measurement-data report type based on the processing result.

In a possible implementation, the related location data includes at least one of: the location measurement data; a requirement of a service of the terminal for location accuracy; a requirement of a service of the terminal for latency accuracy; a moving speed of the terminal; a duration for processing the related location data through the location model; calendar data of the terminal; or location information acquired by the terminal in other manners other than the location measurement data.

In a possible implementation, the location-measurement-data report type includes a first report type and a second report type; the first report type indicates not reporting the location measurement data; and the second report type indicates reporting the location measurement data.

In a possible implementation, the second report type includes a third report type and a fourth report type; a resource overhead indicated by the third report type is greater than a resource overhead indicated by the fourth report type; and the resource overhead includes at least one of: a data volume of report content or a signaling overhead occupied by the report content.

In a possible implementation, acquiring the location-measurement-data report type based on the processing result, includes: determining the location-measurement-data report type by matching the processing result with a preset condition.

In a possible implementation, the method further includes: receiving the preset condition sent by a network side device, a preset condition including one or more preset sub-conditions.

In a possible implementation, determining the location-measurement-data report type by matching the processing result with the preset condition, includes: determining a target sub-condition from a plurality of preset sub-conditions in response to the preset condition including the plurality of preset sub-conditions; the target sub-condition being a condition corresponding to a change of a current report type to a target report type; the current report type being a location-measurement-data report type currently used by the terminal; and determining the target report type as the location-measurement-data report type in response to the processing result matching the target sub-condition.

In a possible implementation, the preset sub-conditions include at least one of: a size relationship between probabilities of N locations in the processing result and a probability threshold; the processing result indicating a size relationship between a distance between two nearest locations in the location model and a distance threshold; the distance threshold being positively correlated with a requirement of a service of the terminal for location accuracy; or the processing result indicating a size relationship between a minimum difference between historical location measurement data of the location model and the location measurement data, and a data difference threshold.

In a possible implementation, acquiring the location-measurement-data report type based on the processing result, includes: reporting a measurement result to a network side device in response to the processing result satisfying triggering a report type update event, in which, the measurement result is data for triggering the report type update; and receiving report type update information of the network side device, in which the report type update information is configured to indicate the location-measurement-data report type.

In a possible implementation, the method further includes: receiving the report type update event sent by the network side device; the report type update event including one or more report type update sub-events.

In a possible implementation, reporting the measurement result to the network side device in response to the processing result satisfying triggering the report type update event, includes: determining a target sub-event from a plurality of report type update sub-events in response to the report type update event including the plurality of report type update sub-events; the target sub-event being an event corresponding to a change of a current report type to a target report type; and the current report type being a location-measurement-data report type currently used by the terminal; and reporting the measurement result to the network side device in response to the processing result satisfying the target sub-event.

In a possible implementation, the location-measurement-data report type currently used by the terminal includes a report type indicated by the network side device through the report type update information last time; or, the location-measurement-data report type currently used by the terminal includes a default report type.

In a possible implementation, the report type update sub-events include at least one of: a size relationship between probabilities of N locations in the processing result and a probability threshold; the processing result indicating a size relationship between a distance between two nearest locations in the location model and a distance threshold; the distance threshold being positively correlated with a requirement of a service of the terminal for location accuracy; or the processing result indicating a size relationship between a minimum difference between historical location measurement data of the location model and the location measurement data, and a data difference threshold.

In a possible implementation, the measurement result includes the location measurement data and the processing result.

In a possible implementation, the method further includes: acquiring the location model from a network side device; or, acquiring the location model by training based on historical location measurement data of the terminal and historical locations corresponding to the historical location measurement data of the terminal; or, acquiring the location model by training based on historical location measurement data of the terminal, historical locations corresponding to the historical location measurement data of the terminal, historical location measurement data of other terminals, and historical locations corresponding to the historical location measurement data of the other terminals; or, acquiring a first model by training based on historical location measurement data of the terminal and historical locations corresponding to the historical location measurement data of the terminal; acquiring a second model from a network side device or other terminals, in which the second model is acquired by training based on historical location measurement data of other terminals and historical locations corresponding to the historical location measurement data of the other terminals; and acquiring the location model by combining the first model and the second model.

In a possible implementation, reporting the location measurement data based on the determined location-measurement-data report type, includes: determining data to be reported for reporting the location measurement data based on the determined location-measurement-data report type; and reporting the data to be reported to a device for receiving the reporting; the device for receiving by the reporting includes at least one of: an LMF, a base station, a terminal in a wireless local area network (WLAN), or other user terminals.

In a possible implementation, reporting the data to be reported to the device for receiving the reporting, includes: reporting the data to be reported after desensitization to the device for receiving the reporting.

In summary, in the solutions as illustrated in embodiments of the disclosure, a plurality of different location-measurement-data report types are provided, report content indicated by different location-measurement-data report types being different. The terminal selects one from the plurality of different location-measurement-data report types for reporting location measurement data when acquiring the location measurement data, without reporting all location measurement data each time, thereby reducing reporting of unnecessary location measurement data, saving signalings or transmission resources, and reducing a location latency.

In embodiments of the disclosure, the location-measurement-data report type may be determined by means of an algorithm model, for example, an artificial intelligence (AI) model.

Figure 3:
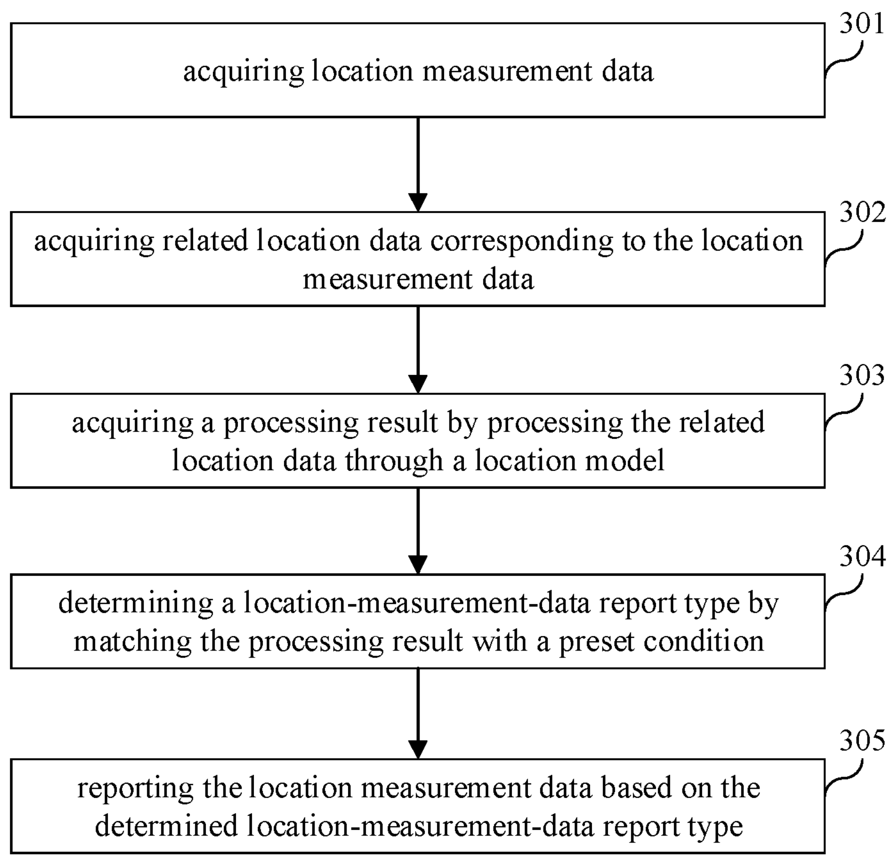
FIG. 3 is a flowchart illustrating a method for reporting location measurement data according to some embodiments.

FIG. 3 is a flowchart illustrating a method for reporting location measurement data according to some embodiments. The method for reporting location measurement data may be performed by a terminal, for example, the terminal 110 in the implementation environment as illustrated in FIG. 1. As illustrated in FIG. 3, the method may include the following steps.

At step 301, location measurement data is acquired.

In some embodiments of the disclosure, the terminal may acquire the location measurement data by measuring a positioning-purpose reference signal (such as a downlink PRS) sent by a base station or a TPR.

The location measurement data includes measured values acquired by measuring a positioning-related reference signal, for example, a signal strength measured value, a signal transmission duration value, an angle value of channel arrival or an angle of channel departure, and the like.

In a possible implementation, the location measurement data further includes at least one of: a TRP ID for transmitting the positioning-purpose reference signal, a cell ID for transmitting the positioning-purpose reference signal, location information of the TRP for transmitting the positioning-purpose reference signal, or location information of the cell for transmitting the positioning-purpose reference signal.

In another possible implementation, the location measurement data includes a measured value acquired by measuring a reference signal between the terminal and a WLAN terminal.

In another possible implementation, the location measurement data includes an ID of the WLAN terminal connected by the terminal and location information of the WLAN terminal.

At step 302, related location data corresponding to the location measurement data are acquired.

In some embodiments of the disclosure, the related location data includes at least one of the following.

1) The location measurement data.

2) A requirement of a service of the terminal for location accuracy; for example, 1 m, 0.2 m, etc.

The terminal may have different services at different moments or different terminals have different service. Requirements of different services for location accuracy may be different. Different report types indicate different report content. Correspondingly, it may have a certain influence on location accuracy. Therefore, in some embodiments of the disclosure, the requirement of the current service of the terminal for location accuracy may be considered when the report type is determined.

3) A requirement of a service of the terminal for latency accuracy; for example, 100 ms, 20 ms, etc.

Similar with the requirement for location accuracy, requirements of different services for latency accuracy may be different and different report types have a certain influence on latency accuracy. Therefore, in some embodiments of the disclosure, the requirement of the current service of the terminal for latency accuracy may be considered when the report type is determined.

4) A moving speed of the terminal.

The terminal may have different requirements for location accuracy and latency accuracy at different moving speeds, that is, the moving speed of the terminal may influence a location-measurement-data report type. Therefore, in some embodiments of the disclosure, the moving speed of the terminal may be considered when the report type is determined.

5) A duration for processing the related location data through the location model.

Generally, there may be a certain correlation between the location where the terminal is located and the current time, for example, at a working time of a working day, such as between 10 am and 5 pm, the possibility of the terminal at the working place is higher, and at a non-working time, the possibility of the terminal at home is higher, such as between 11 pm and 5 am. Therefore, in some embodiments of the disclosure, when the report type is determined, the duration for processing the related location data through the location model may be considered, for example, the current time.

6) Calendar data of the terminal.

A calendar application of the terminal may include some information indicating a route arrangement of the terminal, such as a schedule or a task plan of the terminal, and the information may indicate a probability that the terminal appears at what location at what time to a certain extent. For example, in the calendar application in the terminal, there is a task plan that a meeting starts at a place A at 2 pm. In this case, at 1 pm, the probability that the terminal is located on the way from the company to the A place is higher.

7) Location information acquired by the terminal in other manners other than location measurement data.

The location information acquired in other manners other than location measurement data may include location information acquired by means of satellite positioning or location information manually set by a user.

At step 303, a processing result is acquired by processing the related location data through a location model.

The terminal acquires the processing result output by the location model by inputting the related location data into the location model.

The location model may be a model acquired by training based on historical location measurement data and historical locations corresponding to the historical location measurement data.

In a possible implementation, the location model is a model including a relationship between the related location data and the location.

In another possible implementation, the location model is a machine learning (ML) model, for example, a deep learning model or a neural network model.

The terminal may acquire the location model in the following ways.

1) The location model is acquired from a network side device.

In a possible implementation, the terminal may download the location model from the network side device based on a 3rd generation partnership project (3 GPP) cellular network, for example, a long-term evolution (LTE) network or a 5G NR network or any generation cellular network.

In another possible implementation, the terminal downloads the location model from the network side device through a WLAN network.

The network side device includes a base station, a WLAN terminal, an LMF, a server, or a cloud.

2) The location model is acquired by training based on the historical location measurement data of the terminal and the historical locations corresponding to the historical location measurement data of the terminal.

In a possible implementation, the terminal may record the historical location measurement data acquired in previous measurements and the historical locations acquired by the LMF or the terminal itself based on the historical location measurement data, and acquire the above location model by training based on the historical location measurement data and the historical locations.

3) The location model is acquired by training based on the historical location measurement data of the terminal, the historical locations corresponding to the historical location measurement data of the terminal, historical location measurement data of other terminals, and historical locations corresponding to the historical location measurement data of the other terminals.

In a possible implementation, the terminal trains the location model based on the historical location measurement data and the historical locations of other terminals in addition to the historical location measurement data and the historical locations of the terminal itself.

The historical location measurement data and the historical locations of the other terminals are reported by other terminals to the network side device and sent by the network side device to the terminal; or the historical location measurement data and the historical locations of the other terminals are directly sent by the other terminals to the terminal.

4) A first model is acquired by training based on the historical location measurement data of the terminal and the historical locations corresponding to the historical location measurement data of the terminal; a second model is acquired from the network side device or other terminals, in which the second model is acquired by training based on the historical location measurement data of other terminals and the historical locations corresponding to the historical location measurement data of the other terminals; and the location model is acquired by combining the first model and the second model.

In a possible implementation, on one hand, the terminal acquires the first model by training based on the historical location measurement data and the historical locations of the terminal itself; the terminal acquires the second model by training based on the historical location measurement data and the historical locations of the other terminals, and acquires the above location model by combining the two models.

For example, taking the location model being the model including the relationship between the related location data and the location for an example, the first model includes a corresponding relationship acquired based on the historical location measurement data and the historical locations of the terminal itself, and the second model includes a corresponding relationship acquired based on the historical location measurement data and the historical locations of the other terminals, and the terminal combines two corresponding relationships to acquire the complete location model.

The second model is acquired by the network side device by training based on the historical location measurement data and the historical locations reported by the other terminals and sent to the terminal; or the second model is acquired by the other terminals by training based on the historical location measurement data and the historical locations and sent by the network side device to the terminal; or the second model is acquired by the other terminals based on the historical location measurement data and the historical locations, and directly sent to the terminal.

At step 401, a location-measurement-data report type is reported by matching the processing result with a preset condition.

In some embodiments of the disclosure, report content indicated by different location-measurement-data report types may be different.

In a possible implementation, report content indicated by different location-measurement-data report types being different, refers to a data volume of report content indicated by different location-measurement-data report types being different; or, report content indicated by different location-measurement-data report types being different, refers to a ratio of report content indicated by different location-measurement-data report types to the location measurement data being different.

In a possible implementation, the location-measurement-data report type includes a first report type and a second report type; the first report type indicates not reporting the location measurement data; and the second report type indicates reporting the location measurement data.

That is, in some embodiments of the disclosure, the location-measurement-data report type is divided into reporting and not reporting.

In a possible implementation, the second report type includes a third report type and a fourth report type; a resource overhead indicated by the third report type is greater than a resource overhead indicated by the fourth report type; and the resource overhead includes at least one of: a data volume of report content or a signaling overhead occupied by the report content.

The location-measurement-data report type is further divided into at least two types with different overheads.

For example, in an example solution, the third report type is full reporting, that is, all location measurement data acquired in this measurement are reported. For example, measured values of reference signals between the terminal and all ten base stations or TRIPs are reported, or absolute values of all measurement results are reported. The fourth report type is semi-reporting (or referred to as partial reporting). For example, part of measurement results is reported, that is, part of location measurement data acquired in this measurement is reported. For example, measured values of reference signals between the terminal and five base stations or TRPs in ten base stations or TRPs are reported, or relative values of part of measurement results are reported.

Or, the third report type and the fourth report type are semi-reporting. For example, the third report type is reporting most of location measurement data acquired in this measurement, such as reporting measured values of reference signals between the terminal and six base stations or TRIPs in ten base stations or TRPs, or absolute values of measurement results of the six base stations or TRPs; and the fourth report type is reporting a small part of measurement results, that is, reporting a small part of location measurement data acquired in this measurement; such as reporting measured values of reference signals between the terminal and four base stations or TRIPs in ten base stations or TRPs, or relative values of measurement results of the four base stations or TRPs.

In a possible implementation, the terminal further receives the preset condition sent by the network side device.

In an example solution, the preset condition includes one or more preset sub-conditions.

In some embodiments of the disclosure, the above preset condition is configured by the network side device to the terminal.

Or, in another possible implementation, the above preset condition is statically set in the terminal.

In a possible implementation, determining the location-measurement-data report type by matching the processing result with the preset condition, includes: determining a target sub-condition from a plurality of preset sub-conditions in response to the preset condition including the plurality of preset sub-conditions; the target sub-condition being a condition corresponding to a change of a current report type to a target report type; the current report type being a location-measurement-data report type currently used by the terminal; and determining the target report type as the location-measurement-data report type in response to the processing result matching the target sub-condition.

The current report type is a report type specified by the network side device last time, or the current report type is a default report type, for example, an initial default report type is full reporting.

In some embodiments of the disclosure, different preset sub-conditions are set for change conditions between different report types, for example, for a change from the first report type to the third report type, a preset sub-condition 1 is set, and for a change from the first report type to the fourth report type, a preset sub-condition 2 is set; and correspondingly, for a change from the third report type to the first report type, a preset sub-condition 3 is set, and so on.

In a possible implementation, the preset sub-conditions include at least one of the following.

1) A size relationship between probabilities of N locations in the processing result and a probability threshold.

For example, when the probabilities of N locations are greater than or less than a certain probability threshold, it may be determined that the report type is changed from one to another.

In some embodiments of the disclosure, the greater the value of N and the smaller the probabilities of the N locations, it indicates that more locations may not be accurately eliminated or distinguished, and more location measurement data needs to be reported to ensure location accuracy; and correspondingly, the smaller the value of N and the greater the probabilities of the N locations, it indicates that fewer locations may not be accurately eliminated or distinguished, and less location measurement data needs to be reported to save signalings and transmission resources as much as possible and shorten the latency; when the number of N is 1 and the probability threshold is large enough (for example, 99%), it indicates that accurate location may be performed by the location model, in this case, location measurement data may not be reported.

2) The processing result indicating a size relationship between a distance between two nearest locations in the location model and a distance threshold.

For example, when the distance between the two nearest locations in the location model is greater than or less than the distance threshold, it may be determined that the report type is changed from one to another.

In some embodiments of the disclosure, the greater the distance between the two nearest locations in the location model, indicating the lower the location accuracy that may be provided by the location model, and more location measurement data needs to be reported to ensure location accuracy; and correspondingly, the smaller the distance between the two nearest locations in the location model, indicating the higher the location accuracy that may be provided by the location model, and less location measurement data needs to be reported to save signalings and transmission resources as much as possible and shorten the latency.

In a possible implementation, the distance threshold is positively correlated with a requirement of a service of the terminal for location accuracy. For example, when the distance threshold is greater than 4 times the location accuracy, the final location result maximum may reach 2 times the location accuracy. For example, when the location accuracy of the service requirement of the terminal is 10 m and the distance threshold is 40 m, the final location threshold is 20 m, and does not reach the 10 m location accuracy, and more location measurement data needs to be reported.

3) The processing result indicates a size relationship between a minimum difference between historical location measurement data of the location model and the location measurement data, and a data difference threshold.

In some embodiments of the disclosure, the greater the minimum difference value between the historical location measurement data in the location model and the location measurement data, the lower the location accuracy that may be provided by the location model, and more location measurement data needs to be reported to ensure the location accuracy; and correspondingly, the smaller the minimum difference between the historical location measurement data in the location model and the location measurement data, the higher the location accuracy that may be provided by the location model, and less location measurement data needs to be reported to save signalings and transmission resources as much as possible and shorten the latency.

In some embodiments of the disclosure, when the sub-condition corresponding to a change from the current report type to the other any one report type is not satisfied, it may be determined that the current report type maintains unchanged, that is, the current report type is the location-measurement-data report type determined this time.

In another possible implementation, the preset sub-condition may be configured for the above each report type.

For example, taking the report type including full reporting, semi-reporting, and not reporting for an example.

First, the condition of full reporting may be as follows.

The output result of the location model is that the probabilities of N or more than N locations are almost the same, and are all less than a certain threshold; it indicates that there may be a plurality of locations, that is, it may not be determined where.

The output result of the location model is that the distance between two nearest locations in the model is greater than a threshold1, and the threshold1 may be proportional to the location accuracy of the terminal.

The output result of the location model is that the minimum difference between the measurement result in the input data and the existing measurement result in the model is greater than a threshold2. That is, there is no measurement result close to the input measurement result in the model, indicating that the data in the model is not complete, and needs to be improved by means of terminal feedback.

Second, the condition of semi-reporting may be similar to that of the full reporting, and only the parameter values are different, for example, the value of N and the threshold value are different.

Third, the condition of not reporting may include the following.

The output result of the location model is that the probability of a certain location reaches 99%.

At step 305, the location measurement data is reported based on the determined location-measurement-data report type.

In a possible implementation, the terminal determines data to be reported for reporting the location measurement data based on the determined location-measurement-data report type; and reports the data to be reported to a device for receiving the reporting.

The device for receiving the reporting includes at least one of: an LMF, a base station, a terminal in a WLAN, or other user terminals.

For example, when the location-measurement-data report type is full reporting, the terminal determines all data in the location measurement data as the data to be reported and reports all the data to the device for receiving the reporting; or, when the location-measurement-data report type is semi-reporting, the terminal determines part of data with the strongest signal strength in the location measurement data as the data to be reported and reports the part of data with the strongest signal strength to the device for receiving the reporting; or, when the location-measurement-data report type is not reporting, the terminal does not report the location measurement data to the device for receiving the reporting, or the data reported is empty.

In a possible implementation, considering a privacy setting of the terminal, the terminal reports the data to be reported after desensitization to the device for receiving the reporting. For example, the terminal reports the encrypted data to be reported to the device for receiving the reporting.

In summary, in the solutions as illustrated in embodiments of the disclosure, a plurality of different location-measurement-data report types are provided, report content indicated by different location-measurement-data report types being different. The terminal selects one from the plurality of different location-measurement-data report types for reporting location measurement data when acquiring the location measurement data, without reporting all location measurement data each time, thereby reducing reporting of unnecessary location measurement data, saving signalings or transmission resources, and reducing the location latency.

Figure 4:
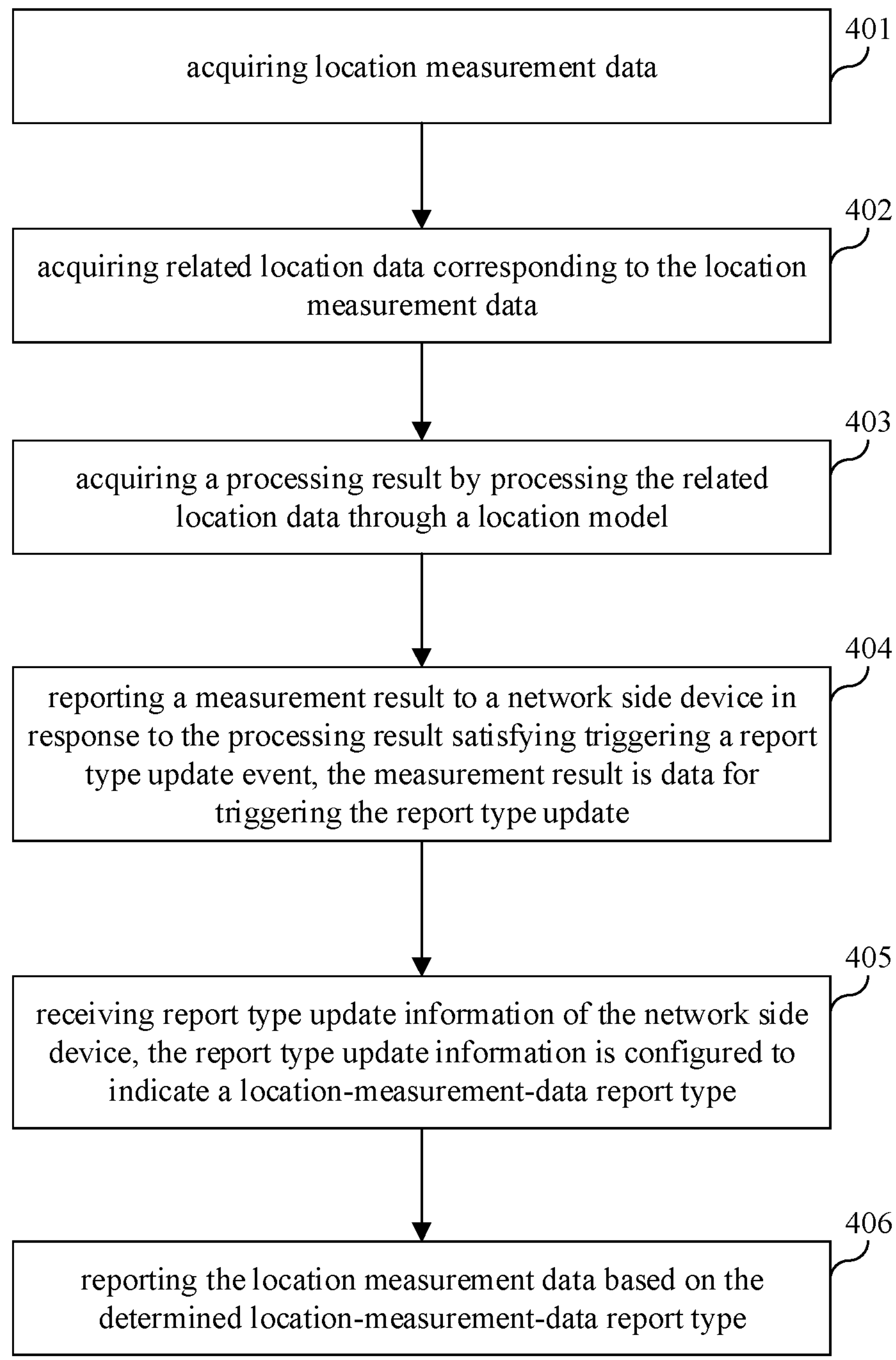
FIG. 4 is a flowchart illustrating a method for reporting location measurement data according to some embodiments.

FIG. 4 is a flowchart illustrating a method for reporting location measurement data according to some embodiments. The method for reporting location measurement data may be performed by a terminal, for example, the terminal 110 in the implementation environment as illustrated in FIG. 1. As illustrated in FIG. 4, the method may include the following steps.

At step 401, location measurement data is acquired.

At step 402, related location data corresponding to the location measurement data are acquired.

At step 403, a processing result is acquired by processing the related location data through a location model.

The execution process of steps 401 to 403 may refer to the execution process of steps 301 to 303 in the above embodiments, which will not be repeated herein.

At step 404, a measurement result is reported to a network side device in response to the processing result satisfying triggering a report type update event. The measurement result is data for triggering the report type update.

The measurement result includes the location measurement data and the processing result.

In some embodiments of the disclosure, the report type update event is configured in the terminal. When the processing result of the location model satisfies triggering the report type update event, the terminal may report the location measurement data and the processing result of the model to the network side device.

In a possible implementation, the terminal further receives the report type update event sent by the network side device; the report type update event including one or more report type update sub-events.

The report type update event is an event configured by the network side device to the terminal.

Or, in another possible implementation, the report type update event is an event statically set in the terminal, for example, an event specified in a communication protocol, has been stored in a terminal chip.

In a possible implementation, reporting the measurement result to the network side device in response to the processing result satisfying triggering the report type update event, includes: determining a target sub-event from a plurality of report type update sub-events in response to the report type update event including the plurality of report type update sub-events; the target sub-event being an event corresponding to a change of a current report type to a target report type; and the current report type being a location-measurement-data report type currently used by the terminal; and reporting the measurement result to the network side device in response to the processing result satisfying the target sub-event.

In some embodiments of the disclosure, different report type update sub-events are set for change conditions between different report types, for example, for a change from the first report type to the third report type, a report type update sub-event 1 is set, and for a change from the first report type to the fourth report type, a report type update sub-event 2 is set; and correspondingly, for a change from the third report type to the first report type, a report type update sub-event 3 is set, and so on.

In a possible implementation, the report type update sub-events include at least one of: a size relationship between probabilities of N locations in the processing result and a probability threshold; the processing result indicating a size relationship between a distance between two nearest locations in the location model and a distance threshold; the distance threshold being positively correlated with a requirement of a service of the terminal for location accuracy; or the processing result indicating a size relationship between a minimum difference between historical location measurement data of the location model and the location measurement data, and a data difference threshold.

The report type update sub-event is similar with the preset sub-condition in embodiments as illustrated in FIG. 3, which will not be repeated herein.

In a possible implementation, the report type update sub-events corresponding to the change conditions between different report types corresponds to the preset sub-conditions corresponding to the change conditions between different report types in embodiments as illustrated in FIG. 3, for example, the preset condition corresponding to the change condition between any two report types is same as the report type update sub-event corresponding to the change condition between the any two report types; or, a parameter threshold of the preset condition corresponding to the change condition between any two report types is different from a parameter threshold of the report type update sub-event corresponding to the change condition between the any two report types.

At step 405, report type update information of the network side device is received. The report type update information is configured to indicate a location-measurement-data report type.

In a possible implementation, the network side device determines accurate location information based on the location measurement data in the measurement result reported by the terminal, and compares the determined location information and the processing result of the location model to determine whether to need to change the report type, and generates the report type update information based on the determination result of whether to need to change the report type, and return it to the terminal. For example, the network side device indicates the terminal to change the report type based on the report type update information when needing to change the report type, and indicates the terminal to maintain the current report type unchanged based on the report type update information or does not need to send the report type update information to the terminal when not needing to change the report type, that is, the terminal does not need to update the report type.

In a possible implementation, the location-measurement-data report type currently used by the terminal includes a report type indicated by the network side device through report type update information last time; or, the location-measurement-data report type currently used by the terminal includes a default report type.

In some embodiments of the disclosure, the terminal initially sets the default report type, for example, when a network is initially accessed each time, the default report type is set as full reporting. The terminal detects satisfying the corresponding report type update sub-event and reports the measurement result to the network side device when needing to change the report type each time, and the network side device determines whether to change the report type and return the report type update information to the terminal.

At step 406, the location measurement data is reported based on the determined location-measurement-data report type.

The execution process of the step 406 may refer to step 305 in embodiments as illustrated in FIG. 3, which will not be repeated herein.

In summary, in the solutions as illustrated in embodiments of the disclosure, a plurality of different location-measurement-data report types are provided, report content indicated by different location-measurement-data report types being different. The terminal selects one from the plurality of different location-measurement-data report types for reporting location measurement data when acquiring the location measurement data, without reporting all location measurement data each time, thereby reducing reporting of unnecessary location measurement data, saving signalings or transmission resources, and reducing the location latency.

The below are apparatus embodiments of the disclosure, which may be configured to implement the method embodiments of the disclosure. For details not disclosed in the apparatus embodiments of the disclosure, reference should be made to the method embodiments of the disclosure.

Figure 5:
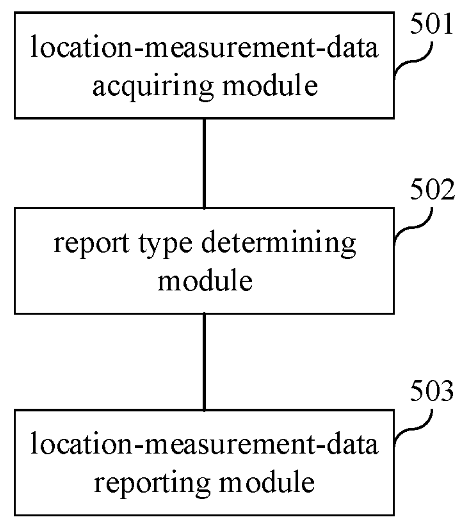
FIG. 5 is a block diagram illustrating an apparatus for reporting location measurement data according to some embodiments.

FIG. 5 is a block diagram illustrating an apparatus for reporting location measurement data according to some embodiments. As illustrated in FIG. 5, the apparatus for reporting location measurement data may execute steps performed by the terminal in embodiments as illustrated in any one of FIG. 2 to FIG. 4. The apparatus for reporting location measurement data may include a location-measurement-data acquiring module 501, a report type determining module 502, and a location-measurement-data reporting module 503.

The location-measurement-data acquiring module 501 is configured to acquire location measurement data.

The report type determining module 502 is configured to determine a location-measurement-data report type, report content indicated by different location-measurement-data report types being different.

The location-measurement-data reporting module 503 is configured to report the location measurement data based on the determined location-measurement-data report type.

In a possible implementation, the report type determining module includes a related-location-data acquiring module, a processing result acquiring submodule, and a report type acquiring submodule. The related-location-data acquiring submodule is configured to acquire related location data; the processing result acquiring submodule is configured to acquire a processing result by processing the related location data through a location model; and the report type acquiring submodule is configured to acquire the location-measurement-data report type based on the processing result.

In a possible implementation, the related location data includes at least one of: the location measurement data; a requirement of a service of the terminal for location accuracy; a requirement of a service of the terminal for latency accuracy; a moving speed of the terminal; a duration for processing the related location data through the location model; calendar data of the terminal; or location information acquired by the terminal in other manners other than the location measurement data.

In a possible implementation, the location-measurement-data report type includes a first report type and a second report type; the first report type indicates not reporting the location measurement data; and the second report type indicates reporting the location measurement data.

In a possible implementation, the second report type includes a third report type and a fourth report type; a resource overhead indicated by the third report type is greater than a resource overhead indicated by the fourth report type; and the resource overhead includes at least one of: a data volume of report content or a signaling overhead occupied by the report content.

In a possible implementation, the report type acquiring submodule is configured to determine the location-measurement-data report type by matching the processing result with a preset condition.

In possible implementation, the apparatus further includes a condition receiving module. The condition receiving module is configured to receive the preset condition sent by a network side device, the preset condition including one or more preset sub-conditions.

In a possible implementation, the report type acquiring submodule is configured to: determine a target sub-condition from a plurality of preset sub-conditions in response to the preset condition including the plurality of preset sub-conditions; the target sub-condition being a condition corresponding to a change of a current report type to a target report type; the current report type being a location-measurement-data report type currently used by the terminal; and determine the target report type as the location-measurement-data report type in response to the processing result matching the target sub-condition.

In a possible implementation, the preset sub-conditions include at least one of: a size relationship between probabilities of N locations in the processing result and a probability threshold; the processing result indicating a size relationship between a distance between two nearest locations in the location model and a distance threshold; the distance threshold being positively correlated with a requirement of a service of the terminal for location accuracy; or the processing result indicating a size relationship between a minimum difference between historical location measurement data of the location model and the location measurement data and a data difference threshold.

In a possible implementation, the report type acquiring submodule is configured to: report a measurement result to a network side device in response to the processing result satisfying triggering a report type update event, the measurement result is data for triggering the report type update; and receive report type update information of the network side device, the report type update information is configured to indicate the location-measurement-data report type.

In possible implementation, the apparatus further includes an event receiving module. The event receiving module is configured to receive the report type update event sent by the network side device; the report type update event including one or more report type update sub-events.

In a possible implementation, the report type acquiring submodule is configured to: determine a target sub-event from a plurality of report type update sub-events in response to the report type update event including the plurality of report type update sub-events; the target sub-event being an event corresponding to a change of a current report type to a target report type; and the current report type being a location-measurement-data report type currently used by the terminal; and report the measurement result to the network side device in response to the processing result satisfying the target sub-event.

In a possible implementation, the location-measurement-data report type currently used by the terminal includes a report type indicated by the network side device through report type update information last time; or, the location-measurement-data report type currently used by the terminal includes a default report type.

In a possible implementation, the report type update sub-events include at least one of: a size relationship between probabilities of N locations in the processing result and a probability threshold; the processing result indicating a size relationship between a distance between two nearest locations in the location model and a distance threshold; the distance threshold being positively correlated with a requirement of a service of the terminal for location accuracy; or the processing result indicating a size relationship between a minimum difference between historical location measurement data of the location model and the location measurement data and a data difference threshold.

In a possible implementation, the measurement result includes the location measurement data and the processing result.

In a possible implementation, the apparatus further includes a model acquiring module. The model acquiring module is configured to: acquire the location model from a network side device; or, acquire the location model by training based on historical location measurement data of the terminal and historical locations corresponding to the historical location measurement data of the terminal; or, acquire the location model by training based on the historical location measurement data of the terminal, the historical locations corresponding to historical location measurement data of the terminal, historical location measurement data of other terminals, and historical locations corresponding to the historical location measurement data of the other terminals; or, acquire a first model by training based on the historical location measurement data of the terminal and the historical locations corresponding to the historical location measurement data of the terminal; acquire a second model from the network side device or other terminals, in which, the second model is acquired by training based on the historical location measurement data of other terminals and the historical locations corresponding to the historical location measurement data of the other terminals; and acquire the location model by combining the first model and the second model.

In a possible implementation, the location measurement data reporting module is configured to: determine data to be reported for reporting the location measurement data based on the determined location-measurement-data report type; and report the data to be reported to a device for receiving the reporting; the device for receiving the reporting includes at least one of: an LMF, a base station, a terminal in a wireless local area network (WLAN), or other user terminals.

In a possible implementation, the location measurement data reporting module is configured to report the data to be reported after desensitization to the device for receiving the reporting.

A data transmission system is further provided in some embodiments of the disclosure. The system includes at least a terminal and a network side device.

The terminal includes the apparatus for reporting location measurement data provided in embodiments as illustrated in FIG. 5.

It should be noted that, when the apparatus provided in the above embodiments implement its function, only the division of the above function modules is given as an example. In practical applications, the above functional allocation may be completed by different function modules according to actual requirements, that is, the content structure of the device is divided into different function modules to complete all or part of functions described above.

With regard to the apparatus in the above embodiments, the specific way in which each module performs the operation has been described in detail in the embodiments of the method and will not be elaborated herein.

A device for reporting location measurement data is provided in some embodiments in the disclosure, to implement all or part of steps executed by the terminal in embodiments as illustrated in any one of FIG. 2 to FIG. 4. The device for reporting location measurement data includes a processor and a memory configured to store instructions executable by the processor.

The processor is configured to: acquire location measurement data; determine a location-measurement-data report type, report content indicated by different location-measurement-data report types being different; and report the location measurement data based on the determined location-measurement-data report type.

The technical solutions provided in embodiments of the disclosure may be introduced mainly by taking the terminal for an example. It may be understood that, the terminal includes hardware structures and/or software modules that execute various functions in order to implement the above functions. In combination with the modules and algorithm steps of the examples described in embodiments of the disclosure, the embodiments of the disclosure may be implemented in the form of hardware or a combination of hardware and computer software. Whether a function is executed by hardware or computer software driven by hardware depends on the specific application and design constraints of the technical solution. Those skilled in the art may adopt different methods for each specific application to implement the described functions, but such implementation should not be considered as beyond the scope of the technical solutions of embodiments of the disclosure.

Figure 6:
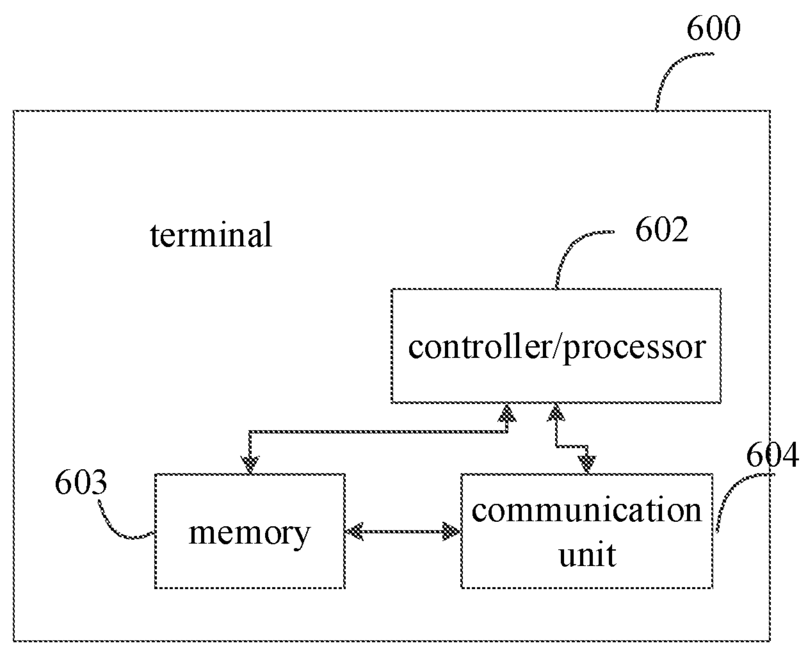
FIG. 6 is a diagram illustrating a structure of a terminal according to some embodiments.

FIG. 6 is a diagram illustrating a structure of a terminal according to some embodiments. The terminal may be implemented as the terminal in the system environment as illustrated in FIG. 1.

The terminal 600 includes a communication unit 604 and a processor 602. The processor 602 also may be a controller, represented as a "controller/processor 602" in FIG. 6. The communication unit 604 is configured to support communication between the terminal and other network entities (for example, other terminals or a base station).

Further, the terminal 600 further may include a memory 603 configured to store program codes and data of the terminal 600.

It may be understood that, FIG. 6 only illustrates a simplified design of the terminal 600. In practical applications, the terminal 600 may include any number of processors, controllers, memories, communication units, etc., and all terminals that may achieve embodiments of the disclosure are within the protection scope of embodiments of the disclosure.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Those skilled may realize that in one or more examples, the functions described in embodiments of the disclosure may be implemented with a hardware, a software, a firmware, or a combination thereof. The functions may be stored in a computer readable storage medium or transmitted as one or more instructions or codes on a computer readable storage medium when implemented with the software. The computer readable medium includes a computer storage medium and a communication medium. The communication medium includes any medium that facilitates transmission of a computer program from one place to another. The storage medium may be any available medium that may be accessed by a general purpose or special purpose computer.

A computer storage medium is provided in embodiments of the disclosure. The computer storage medium is configured to store executable instructions used by the terminal, for example, computer software instructions, the executable instructions being called by the processor in the terminal to implement the method for reporting location measurement data.

A computer program product or a computer program is provided in embodiments of the disclosure. The computer program product or the computer program includes computer instructions stored in the computer readable storage medium. The processor of the computer device reads the computer instructions from the computer readable storage medium, and the processor executes the computer instructions to cause the computer device to perform the method for reporting location measurement data.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof.

The invention claimed is:

1. A method for reporting location measurement data, performed by a terminal, comprising:

acquiring location measurement data;

determining a location-measurement-data report type, report content indicated by different location-measurement-data report types being different; and reporting the location measurement data based on the determined location-measurement-data report type, wherein:

the location-measurement-data report type comprises a first report type and a second report type;

the first report type indicates not reporting the location measurement data;

the second report type indicates reporting the location measurement data;

the second report type comprises a third report type and a fourth report type; and a resource overhead indicated by the third report type is greater than a resource overhead indicated by the fourth report type; and the resource overhead comprises at least one of: a data volume of report content or a signaling overhead occupied by the report content.

2. The method as claimed in claim 1, wherein determining the location-measurement-data report type comprises:

acquiring related location data corresponding to the location measurement data;

acquiring a processing result by processing the related location data through a location model; and acquiring the location-measurement-data report type based on the processing result.

3. The method as claimed in claim 2, wherein the related location data comprises at least one of:

the location measurement data;

a requirement of a service of the terminal for location accuracy;

a requirement of a service of the terminal for latency accuracy;

a moving speed of the terminal;

a duration for processing the related location data through the location model;

calendar data of the terminal; or location information acquired by the terminal in other manners other than the location measurement data.

4. The method as claimed in claim 2, wherein acquiring the location-measurement-data report type based on the processing result, comprises:

reporting a measurement result to a network side device in response to the processing result satisfying triggering a report type update event, wherein the measurement result is data for triggering the report type update; and receiving report type update information of the network side device, wherein the report type update information is configured to indicate the location-measurement-data report type.

5. The method as claimed in claim 4, further comprising: receiving the report type update event sent by the network side device; the report type update event comprising one or more report type update sub-events.

6. The method as claimed in claim 5, wherein reporting the measurement result to the network side device in response to the processing result satisfying triggering the report type update event comprises:

determining a target sub-event from a plurality of report type update sub-events in response to the report type update event comprising the plurality of report type update sub-events; the target sub-event being an event corresponding to a change of a current report type to a target report type; and the current report type being a location-measurement-data report type currently used by the terminal; and reporting the measurement result to the network side device in response to the processing result satisfying the target sub-event.

7. The method as claimed in claim 6, wherein:

the location-measurement-data report type currently used by the terminal comprises at least one of: a report type indicated by the network side device through report type update information last time; or, the location-measurement-data report type currently used by the terminal comprises a default report type.

8. The method as claimed in claim 5, wherein the report type update sub-events comprise at least one of:

a size relationship between probabilities of N locations in the processing result and a probability threshold;

the processing result indicating a size relationship between a distance between two nearest locations in the location model and a distance threshold; the distance threshold being positively correlated with a requirement of a service of the terminal for location accuracy; or the processing result indicating a size relationship between a minimum difference between historical location measurement data of the location model and the location measurement data, and a data difference threshold.

9. The method as claimed in claim 4, wherein the measurement result comprises the location measurement data and the processing result.

10. The method as claimed in claim 2, further comprising at least one of:

acquiring the location model from a network side device;

acquiring the location model by training based on historical location measurement data of the terminal and historical locations corresponding to the historical location measurement data of the terminal;

acquiring the location model by training based on the historical location measurement data of the terminal, the historical locations corresponding to historical location measurement data of the terminal, historical location measurement data of other terminals, and historical locations corresponding to the historical location measurement data of the other terminals;

or, acquiring a first model by training based on the historical location measurement data of the terminal and the historical locations corresponding to the historical location measurement data of the terminal; acquiring a second model from the network side device or other terminals, wherein the second model is acquired by training based on the historical location measurement data of other terminals and the historical locations corresponding to the historical location measurement data of the other terminals; and acquiring the location model by combining the first model and the second model.

11. The method as claimed in claim 1, wherein acquiring the location-measurement-data report type based on the processing result comprises:

determining the location-measurement-data report type by matching the processing result with a preset condition.

12. The method as claimed in claim 11, further comprising:

receiving the preset condition sent by a network side device, the preset condition comprising one or more preset sub-conditions.

13. The method as claimed in claim 12, wherein the preset sub-conditions comprise at least one of:

a size relationship between probabilities of N locations in the processing result and a probability threshold;

the processing result indicating a size relationship between a distance between two nearest locations in the location model and a distance threshold; the distance threshold being positively correlated with a requirement of a service of the terminal for location accuracy; or the processing result indicating a size relationship between a minimum difference between historical location measurement data of the location model and the location measurement data, and a data difference threshold.

14. The method as claimed in claim 12, wherein determining the location-measurement-data report type by matching the processing result with the preset condition, comprises:

determining a target sub-condition from a plurality of preset sub-conditions in response to the preset condition comprising the plurality of preset sub-conditions; the target sub-condition being a condition corresponding to a change of a current report type to a target report type; the current report type being a location-measurement-data report type currently used by the terminal; and determining the target report type as the location-measurement-data report type in response to the processing result matching the target sub-condition.

15. The method as claimed in claim 1, wherein reporting the location measurement data based on the determined location-measurement-data report type comprises:

determining data to be reported for reporting the location measurement data based on the determined location-measurement-data report type; and reporting the data to be reported to a device for receiving the reporting;

the device for receiving the reporting comprises at least one of: a location management function entity, a base station, a terminal in a wireless local area network (WLAN), or other user terminals.

16. The method as claimed in claim 15, wherein reporting the data to be reported to the device for receiving the reporting comprises:

reporting the data to be reported after desensitization to the device for receiving the reporting.

17. A terminal for reporting location measurement data, comprising:

a processor and a memory configured to store instructions executable by the processor;

wherein, the processor is configured to:

acquire location measurement data;

determine a location-measurement-data report type, report content indicated by different location-measurement-data report types being different; and report the location measurement data based on the determined location-measurement-data report type, wherein:

the location-measurement-data report type comprises a first report type and a second report type;

the first report type indicates not reporting the location measurement data;

the second report type indicates reporting the location measurement data;

the second report type comprises a third report type and a fourth report type; and a resource overhead indicated by the third report type is greater than a resource overhead indicated by the fourth report type; and the resource overhead comprises at least one of: a data volume of report content or a signaling overhead occupied by the report content.

18. A non-transitory computer readable storage medium having stored therein instructions that, when executed by a processor of a terminal, causes the terminal to perform:

acquiring location measurement data;

determining a location-measurement-data report type, report content indicated by different location-measurement-data report types being different; and reporting the location measurement data based on the determined location-measurement-data report type, wherein:

the location-measurement-data report type comprises a first report type and a second report type;

the first report type indicates not reporting the location measurement data;

the second report type indicates reporting the location measurement data;

the second report type comprises a third report type and a fourth report type; and a resource overhead indicated by the third report type is greater than a resource overhead indicated by the fourth report type; and the resource overhead comprises at least one of: a data volume of report content or a signaling overhead occupied by the report content.

* * * * *